United States Patent
Lin

(10) Patent No.: US 8,340,300 B2
(45) Date of Patent: *Dec. 25, 2012

(54) NON-DISRUPTIVE AUTHENTICATION ADMINISTRATION

(75) Inventor: Felix Changmin Lin, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 641 days.

This patent is subject to a terminal disclaimer.

(21) Appl. No.: 11/895,884

(22) Filed: Aug. 27, 2007

(65) Prior Publication Data

US 2007/0294748 A1    Dec. 20, 2007

Related U.S. Application Data

(63) Continuation of application No. 10/246,009, filed on Sep. 17, 2002, now Pat. No. 7,266,201.

(51) Int. Cl.
*H04L 9/08* (2006.01)
*H04L 9/32* (2006.01)
(52) U.S. Cl. ........................ 380/278; 713/171
(58) Field of Classification Search .............. 380/278; 713/171, 726; 726/3, 4, 21
See application file for complete search history.

(56) References Cited

U.S. PATENT DOCUMENTS

| | | | |
|---|---|---|---|
| 5,778,065 A * | 7/1998 | Hauser et al. | 713/155 |
| 6,295,361 B1 * | 9/2001 | Kadansky et al. | 380/278 |
| 6,574,464 B1 * | 6/2003 | Chen | 455/406 |
| 6,950,522 B1 * | 9/2005 | Mitchell et al. | 380/280 |
| 7,120,421 B2 * | 10/2006 | Hermann et al. | 455/410 |
| 7,266,201 B1 * | 9/2007 | Lin | 380/278 |
| 7,400,733 B1 * | 7/2008 | Cam-Winget et al. | 380/283 |
| 7,526,092 B2 * | 4/2009 | Chesson et al. | 380/273 |
| 7,778,166 B2 * | 8/2010 | Dewan et al. | 370/229 |
| 8,073,777 B2 * | 12/2011 | Barry et al. | 705/50 |
| 8,087,070 B2 * | 12/2011 | Koh et al. | 726/5 |
| 2002/0154782 A1 * | 10/2002 | Chow et al. | 380/278 |
| 2002/0164029 A1 * | 11/2002 | Jiang | 380/270 |
| 2003/0048905 A1 * | 3/2003 | Gehring et al. | 380/270 |
| 2005/0031126 A1 * | 2/2005 | Edney et al. | 380/278 |
| 2005/0108576 A1 * | 5/2005 | Munshi | 713/201 |
| 2007/0183599 A1 * | 8/2007 | Cohen et al. | 380/278 |

OTHER PUBLICATIONS

Office Action issued in U.S. Appl. No. 10/246,009, dated Mar. 29, 2006.
Office Action issued in U.S. Appl. No. 10/246,009, dated Jul. 24, 2006.

(Continued)

*Primary Examiner* — Nathan Flynn
*Assistant Examiner* — Abdullah Almamun
(74) *Attorney, Agent, or Firm* — Nixon Peabody LLP; John P. Schaub

(57) ABSTRACT

A configurable timer may be used for seamless authentication administration. A network administrator may set the timer value. Then the network administrator may begin to update the authentication configuration or key and the timer may begin to count down. While the timer counts down, the network device may still send outgoing packets using the old authentication configuration or key and may begin to authenticate incoming packets using both the old authentication configuration or key and the new authentication configuration or key. Once it expires, the network device may begin to send outgoing packets using just the new authentication configuration or key. The counter may then be reset and counted down again. Once the counter expires a second time, the new authentication configuration or key may be used for both incoming and outgoing packets. Two-timer implementations are also possible.

20 Claims, 7 Drawing Sheets

OTHER PUBLICATIONS

Office Action issued in U.S. Appl. No. 10/246,009, dated Dec. 11, 2006.
Notice of Allowance issued in U.S. Appl. No. 10/246,009, dated Jul. 3, 2007.
Cisco's "OSPF Design Guide," http://www.cisco.com/warp/pullic/104.2.html, Sep. 2002, pp. 1-17.
"Foundry Switch and Router Installation and Configuration Guide," Foundry Networks, Inc., Sep. 2000, Chapter 17, pp. 17-1-17-50.

* cited by examiner

NON-DISRUPTIVE AUTHENTICATION ADMINISTRATION

CROSS-REFERENCE TO RELATED APPLICATIONS

This application is a continuation of prior U.S. patent application Ser. No. 10/246,009, entitled "Non-Disruptive Authentication Administration," filed on Sep. 17, 2002 now U.S. Pat. No. 7,266,201.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of network authentication administration. More particularly, the present invention relates to a non-disruptive solution for authentication administration.

BACKGROUND OF THE INVENTION

The concept of authorization in a computer network involves the verification of the identity of a user. This is mainly used as a security feature to ensure that unauthorized access does not occur. There are many different types of authentication available, and the choice of authentication type can be based on many factors, not the least of which is the protocol used in transmitting packets throughout the network. Additionally, each authentication type can have many different styles available. For example, the Open Shortest Path First (OSPF) Internet routing protocol provides for three possible authentication styles: no authentication, simple password authentication, and Message Digest (MD5) authentication. Thus it is sometimes necessary for a network administrator to change the authentication configuration style of the network. Additionally, certain authentication styles, such as MD5, provide for a key to be used cryptographically. Thus, it is sometimes necessary for the network administrator to change the key while remaining within the same style of authentication.

A problem, however, is encountered when altering configuration styles and keys. A network is not a single entity, it is in fact composed of many different devices all communicating to each other. Typically, therefore, a network administrator will need to update many routers throughout the network whenever a common change is required. However, updating many devices can take time, and during that time the system may not run properly and/or unauthorized users may gain access, because some devices may contain the new configuration or key information while others still only have the old configuration or key information. Thus, what is needed is a solution that allows for the seamless updating of configuration or key information.

One solution that has been attempted in the past is to keep a set of timers, one configurable, and one not. This approach was limited to changing key information in the MD5 style and did not apply to style/general configuration changes. In it, a key activation timer, configured by the administrator, was started upon an MD5 key change. The old key was used for transmitting packets before this timer began counting down, and the old key was used for authenticating received packets as well. After the timer activated, the old key was still used for transmitting packets and both the new and the old key were used to authenticate incoming packets.

When the key activation timer lapsed, an old key deactivation timer was started. This old key deactivation timer was not configurable. While the old-key deactivation timer counted down, the new key was used to send packets, and both old and new keys were used to authenticate incoming packets. After the timer ran out, the new key was used to send out packets, and the new key was used to authenticate incoming packets.

This approach had several problems, however. First, the behavior of the authentication state transitions was not consistent. Thus, none-to-simple transitions happened immediately, but MD5 key changes waited for the activation timer. This caused some confusion as to when exactly a new configuration style would be activated. Additionally, the old key deactivation timer would sometimes have a delay that was too long or too short for the network in which it was operating. For example, in a smaller network, changes are iterated through the routers much faster, and the fixed time could be too long, causing unnecessary delay in fully implementing the new key. Additionally, in a very large network, the fixed time could be too slow, causing reliability issues.

What is needed is a solution that does not suffer the drawbacks of the prior art.

BRIEF DESCRIPTION OF THE INVENTION

A configurable timer may be used for seamless authentication administration. A network administrator may set the timer value. Then the network administrator may begin to update the authentication configuration or key and the timer may begin to count down. While the timer counts down, the network device may still send outgoing packets using the old authentication configuration or key and may begin to authenticate incoming packets using both the old authentication configuration or key and the new authentication configuration or key. Once it expires, the network device may begin to send outgoing packets using just the new authentication configuration or key. The counter may then be reset and counted down again. Once the counter expires a second time, the new authentication configuration or key may be used for both incoming and outgoing packets. Two-timer implementations are also possible.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention utilizes a configurable timer or timers to allow for seamless authentication administration. The timers are applied not only to key changes but to configuration style and/or other configuration changes as well.

In a specific embodiment of the present invention, a single timer is utilized. However, in other embodiments, two timers may be used. The present application will discuss an implementation using a single timer but the claims should be interpreted to allow for multiple timers where applicable.

Figure 1:
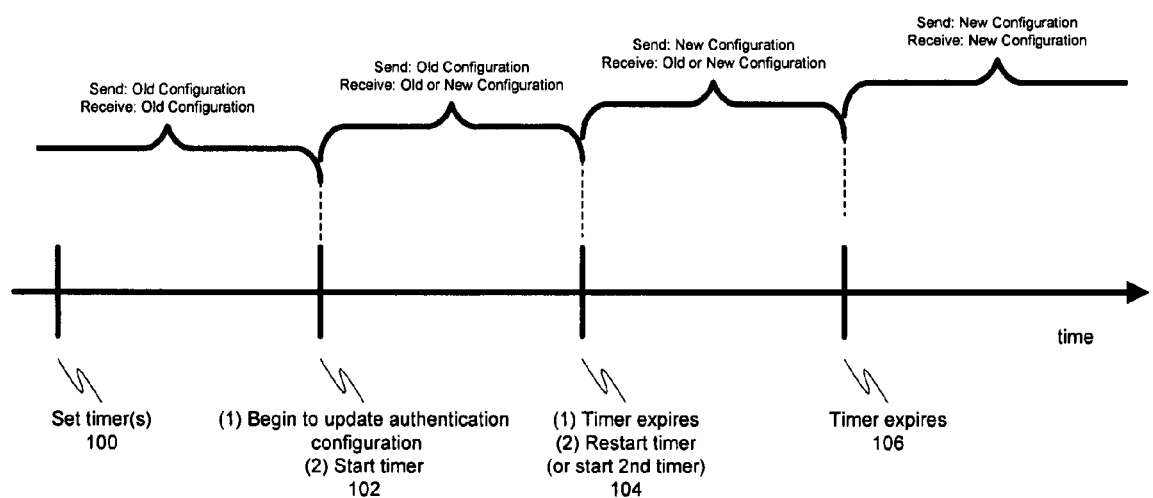
FIG. 1 is a diagram illustrating an example time line for an execution using a specific embodiment of the present invention.

FIG. 1 is a diagram illustrating an example time line for an execution using a specific embodiment of the present invention. At time 100, the timer value may be set throughout the network. In an implementation with multiple timers, both timer values may be set at this time. The timer value may be whatever the network administrator chooses, but it should be chosen such that it represents enough time for a change to take effect throughout the network (i.e., the time it takes for the change to get to every router in the network, added to the time it takes for a router to implement the change). At 102, the network administrator may begin updating the authentication configuration. At this time, the timer may start counting down as well. The time period between 100 and 102 may be whatever the network administrator chooses, but given that the time it takes to implement the setting of the timer value throughout the network is roughly equivalent to the amount of time it take implement a change in configuration, it is believed that in many cases the time period between 100 and 102 will be similar to the timer value.

Before 102, authentication may continue to be fully implemented using the old configuration. Namely, outgoing packets are sent with the old configuration and incoming packets are authenticated with the old configuration. After 102, however, the system may partially implement the new configuration. Specifically, outgoing packets may continue being sent with the old configuration, while incoming packets may be authenticated using both the old and new configurations (if either configuration leads to successful authentication, then authentication is deemed successful).

At 104, the timer has run out. Therefore, the time period between 102 and 104 is equal to the timer value. Once the timer has run out, the new configuration may be used for all outgoing packets. Therefore, after 104, for outgoing packets, the new configuration may be used, whereas for incoming packets, both the old and the new configurations may continue to be used. Also at 104, the timer value may be reset. Thus, in effect, the timer counts down twice: once between 102 and 104, and once between 104 and 106, the time at which the timer once again expires. However, in some implementations this timer may in fact be two distinct timers.

After 106, then the new configuration may be fully implemented, and the new configuration may be used for both incoming and outgoing packets.

Figure 2:
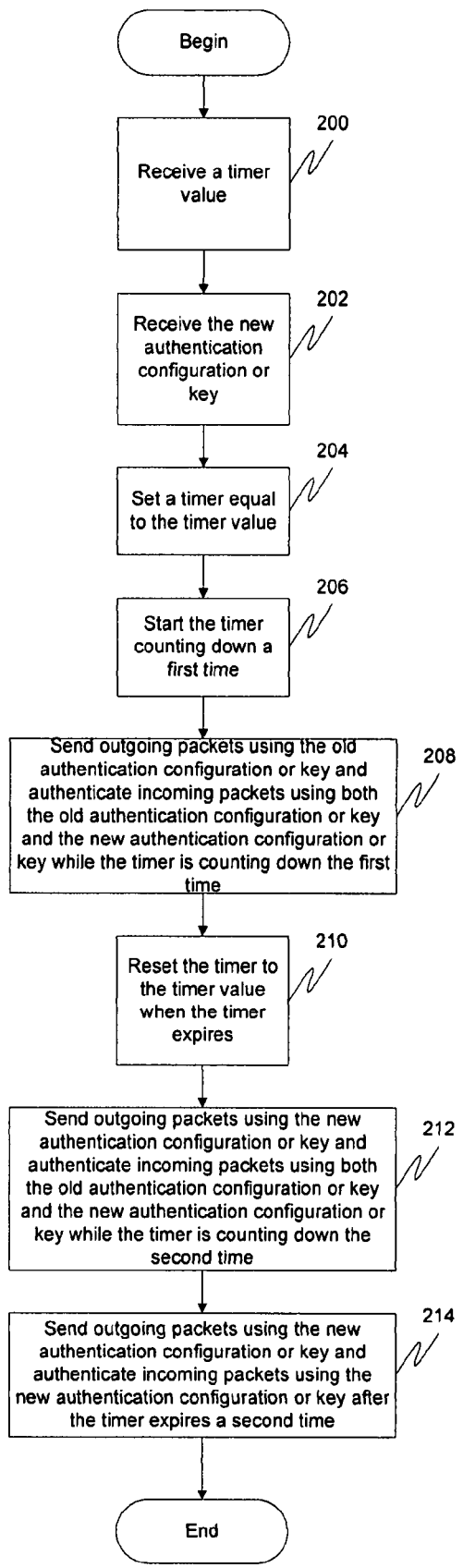
FIG. 2 is a flow diagram illustrating a method for implementing a new authentication configuration or key in a network device having an old authentication configuration or key in accordance with a specific embodiment of the present invention.

FIG. 2 is a flow diagram illustrating a method for implementing a new authentication configuration or key in a network device having an old authentication configuration or key in accordance with a specific embodiment of the present invention. At 200, a timer value may received. This would likely have been sent by a network administrator and should be set such that it represents an amount of time greater than or equal to a predicted amount of time necessary to update all network devices in a network containing the network device with the new authentication configuration or key. At 202, the new authentication configuration or key may be received. At 204, a timer may be set to be equal to the timer value. At 206, the timer may start to be counted down a first time. At 208, while the timer is counting down the first time, outgoing packets may be sent using the old authentication configuration or key and incoming packets may be authenticated using both the old authentication configuration or key and the new authentication configuration or key. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration is successful.

At 210, when the timer expires a first time, the timer may be reset to the timer value. At 212, while the timer is counting down the second time, outgoing packets may be sent using the new authentication configuration or key and incoming packets may be authenticated using both the old authentication configuration or key and the new authentication configuration or key. At 214, after the timer expires a second time, outgoing packets may be sent using the new authentication configuration or key and incoming packets may be authenticated using the new authentication configuration or key.

Figure 3:
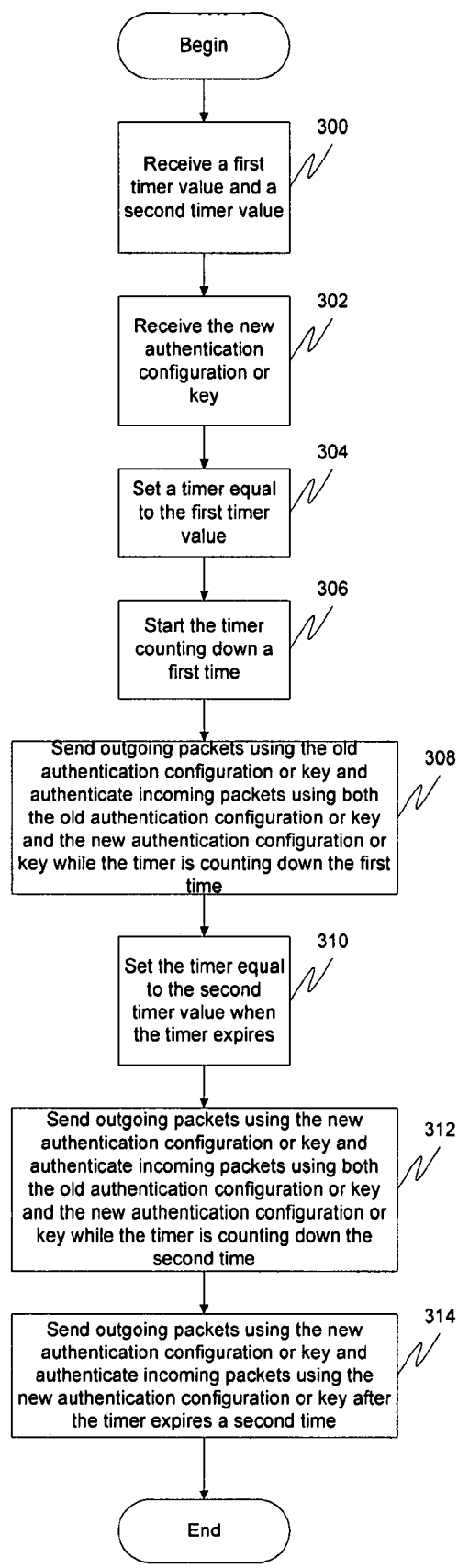
FIG. 3 is a flow diagram illustrating a method for implementing a new authentication configuration or key in a network device having an old authentication configuration or key in accordance with another specific embodiment of the present invention.

FIG. 3 is a flow diagram illustrating a method for implementing a new authentication configuration or key in a network device having an old authentication configuration or key in accordance with another specific embodiment of the present invention. At 300, a first timer value and a second timer value may received. These would likely have been sent by a network administrator and the first timer value should be set such that the first timer represents an amount of time greater than or equal to a predicted amount of time necessary to update all network devices in a network containing the network device with the new authentication configuration or key. In order to prevent the possibility of authentication problems, the second timer value should be set to be equal to or greater than the first timer value and it should represent an amount of time greater than or equal to a predicted amount of time necessary for all network devices in a network to switch to the new authentication configuration or key for sending outgoing packets. At 302, the new authentication configuration or key may be received. At 304, a timer may be set to be equal to the first timer value. At 306, the timer may start to be counted down a first time. At 308, while the timer is counting down the first time, outgoing packets may be sent using the old authentication configuration or key and incoming packets may be authenticated using both the old authentication configuration or key and the new authentication configuration or key. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration or key is successful.

At 310, when the timer expires a first time, the timer may be set to the second timer value. At 312, while the timer is counting down the second time, outgoing packets may be sent using the new authentication configuration or key and incoming packets may be authenticated using both the old authentication configuration or key and the new authentication configuration or key. At 314, after the timer expires a second time, outgoing packets may be sent using the new authentication configuration or key and incoming packets may be authenticated using the new authentication configuration or key.

Figure 4:
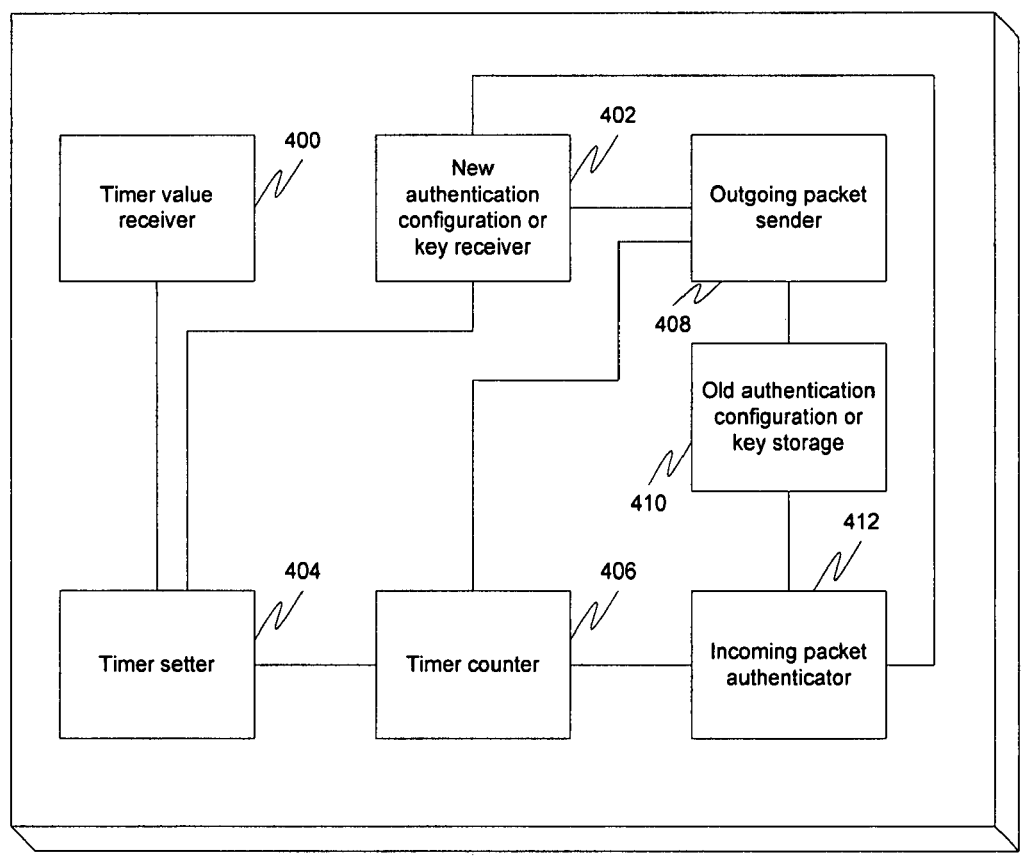
FIG. 4 is a block diagram illustrating an apparatus for implementing a new authentication configuration or key in a network device having an old authentication configuration or key in accordance with a specific embodiment of the present invention.

FIG. 4 is a block diagram illustrating an apparatus for implementing a new authentication configuration or key in a network device having an old authentication configuration or key in accordance with a specific embodiment of the present invention. A timer value receiver 400 may receive a timer value. This would likely have been sent by a network administrator and should be set such that it represents an amount of time greater than or equal to a predicted amount of time necessary to update all network devices in a network containing the network device with the new authentication configuration or key. A new authentication configuration or key receiver 402 may receive the new authentication configuration or key. A timer setter 404 coupled to the timer value receiver 400 and to the new authentication configuration or key receiver 402 may set a timer to be equal to the timer value. A timer counter 406 coupled to the timer setter 404 may start the timer counting down a first time. An outgoing packet sender 408 coupled to the timer counter 406, the new authentication configuration or key receiver 402, and to an old configuration or key storage 410 may send outgoing packets using the old authentication configuration or key while the timer is counting down the first time. An incoming packet authenticator 412 coupled to the timer counter 406, the new authentication configuration or key receiver 402, and to the old configuration or key storage 410 may authenticate incoming packets using both the old authentication configuration or key and the new authentication configuration or key while the timer is counting down the first time. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration or key is successful.

When the timer expires a first time, the timer setter 404 may reset the timer to the timer value. Then the outgoing packet sender 408 may send outgoing packets using the new authentication configuration or key and the incoming packet authenticator 412 may authenticate incoming packets using both the old authentication configuration or key and the new authentication configuration or key while the timer is counting down the second time.

The outgoing packet sender 408 may send outgoing packets using the new authentication configuration or key and the incoming packet authenticator 412 may authenticate incoming packets using the new authentication configuration or key while the timer after the timer expires the second time.

Figure 5:
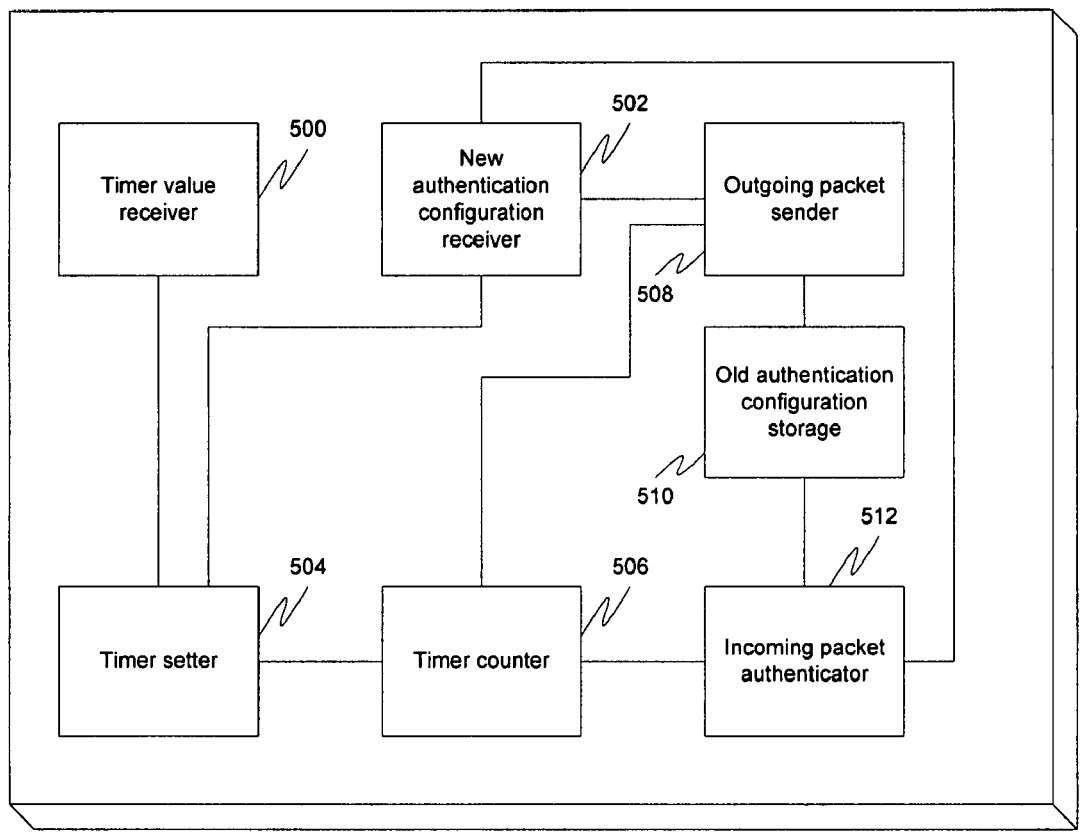
FIG. 5 is a block diagram illustrating an apparatus for implementing a new authentication configuration in a network device having an old authentication configuration in accordance with a specific embodiment of the present invention.

FIG. 5 is a block diagram illustrating an apparatus for implementing a new authentication configuration in a network device having an old authentication configuration in accordance with a specific embodiment of the present invention. A timer value receiver 500 may receive a timer value. This would likely have been sent by a network administrator and should be set such that it represents an amount of time greater than or equal to a predicted amount of time necessary to update all network devices in a network containing the network device with the new authentication configuration. A new authentication configuration receiver 502 may receive the new authentication configuration. A timer setter 504 coupled to the timer value receiver 500 and to the new authentication configuration receiver 502 may set a timer to be equal to the timer value. A timer counter 506 coupled to the timer setter 504 may start the timer counting down a first time. An outgoing packet sender 508 coupled to the timer counter 506, the new authentication configuration receiver 502, and to an old authentication configuration storage 510 may send outgoing packets using the old authentication configuration while the timer is counting down the first time. An incoming packet authenticator 512 coupled to the timer counter 506, the new authentication configuration receiver 502, and to the old authentication configuration storage 510 may authenticate incoming packets using both the old authentication configuration and the new authentication configuration while the timer is counting down the first time. Authenticating packets using both the old authentication configuration and the new authentication configuration may involve, for each packet, authenticating the packet using the old authentication configuration, authenticating the packet using the new authentication configuration, and then accepting the packet as authenticated if either the authenticating under the old authentication configuration or the authenticating under the new authentication configuration is successful.

When the timer expires a first time, the timer setter 504 may reset the timer to the timer value. Then the outgoing packet sender 508 may send outgoing packets using the new authentication configuration and the incoming packet authenticator 512 may authenticate incoming packets using both the old authentication configuration and the new authentication configuration while the timer is counting down the second time. The outgoing packet sender 508 may send outgoing packets using the new authentication configuration and the incoming packet authenticator 512 may authenticate incoming packets using the new authentication configuration while the timer after the timer expires the second time.

Figure 6:
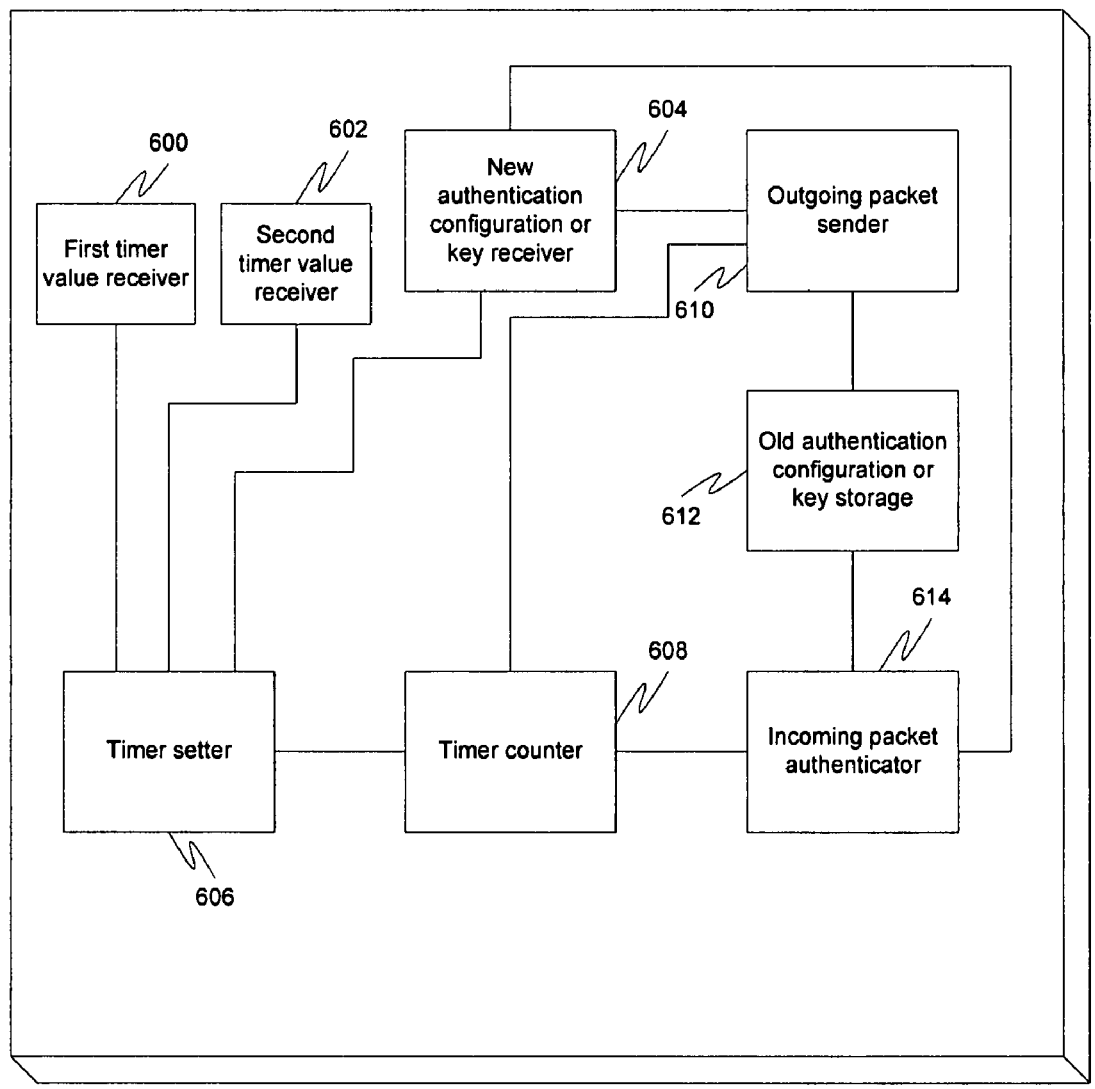
FIG. 6 is a block diagram illustrating an apparatus for implementing a new authentication configuration or key in a network device having an old authentication configuration or key in accordance with another specific embodiment of the present invention.

FIG. 6 is a block diagram illustrating an apparatus for implementing a new authentication configuration or key in a network device having an old authentication configuration or key in accordance with another specific embodiment of the present invention. A first timer value receiver 600 may receive a first timer value. A second timer value receiver 602 may receive a second timer value. These would likely have been sent by a network administrator and the first timer value should be set such that it represents an amount of time greater than or equal to a predicted amount of time necessary to update all network devices in a network containing the network device with the new authentication configuration or key. In order to prevent the possibility of authentication problems, the second timer value should be set to be equal to or greater than the first timer value and it should represent an amount of time greater than or equal to the predicted amount of time necessary to update all network devices in a network to switch to the new authentication configuration or key for sending outgoing packets. A new authentication configuration or key receiver 604 may receive the new authentication configuration or key. A timer setter 606 coupled to the first timer value receiver 600, the second timer value receiver 602, and to the new authentication configuration or key receiver 604 may set a timer to be equal to the first timer value. A timer counter 608 coupled to the timer setter 606 may start the timer counting down a first time. An outgoing packet sender 610 coupled to the timer counter 608, the new authentication configuration or key receiver 604, and to an old configuration authentication or key storage 612 may send outgoing packets using the old authentication configuration or key while the timer is counting down the first time. An incoming packet authenticator 614 coupled to the timer counter 608, the new authentication configuration or key receiver 604, and to the old configuration authentication or key storage 612 may authenticate incoming packets using both the old authentication configuration or key and the new authentication configuration or key while the timer is counting down the first time. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration or key is successful.

When the timer expires a first time, the timer setter 606 may set the timer to the second timer value. Then the outgoing packet sender 610 may send outgoing packets using the new authentication configuration or key and the incoming packet authenticator 614 may authenticate incoming packets using both the old authentication configuration or key and the new authentication configuration or key while the timer is counting down the second time.

The outgoing packet sender 610 may send outgoing packets using the new authentication configuration or key and the incoming packet authenticator 614 may authenticate incoming packets using the new authentication configuration or key while the timer after the timer expires the second time.

Figure 7:
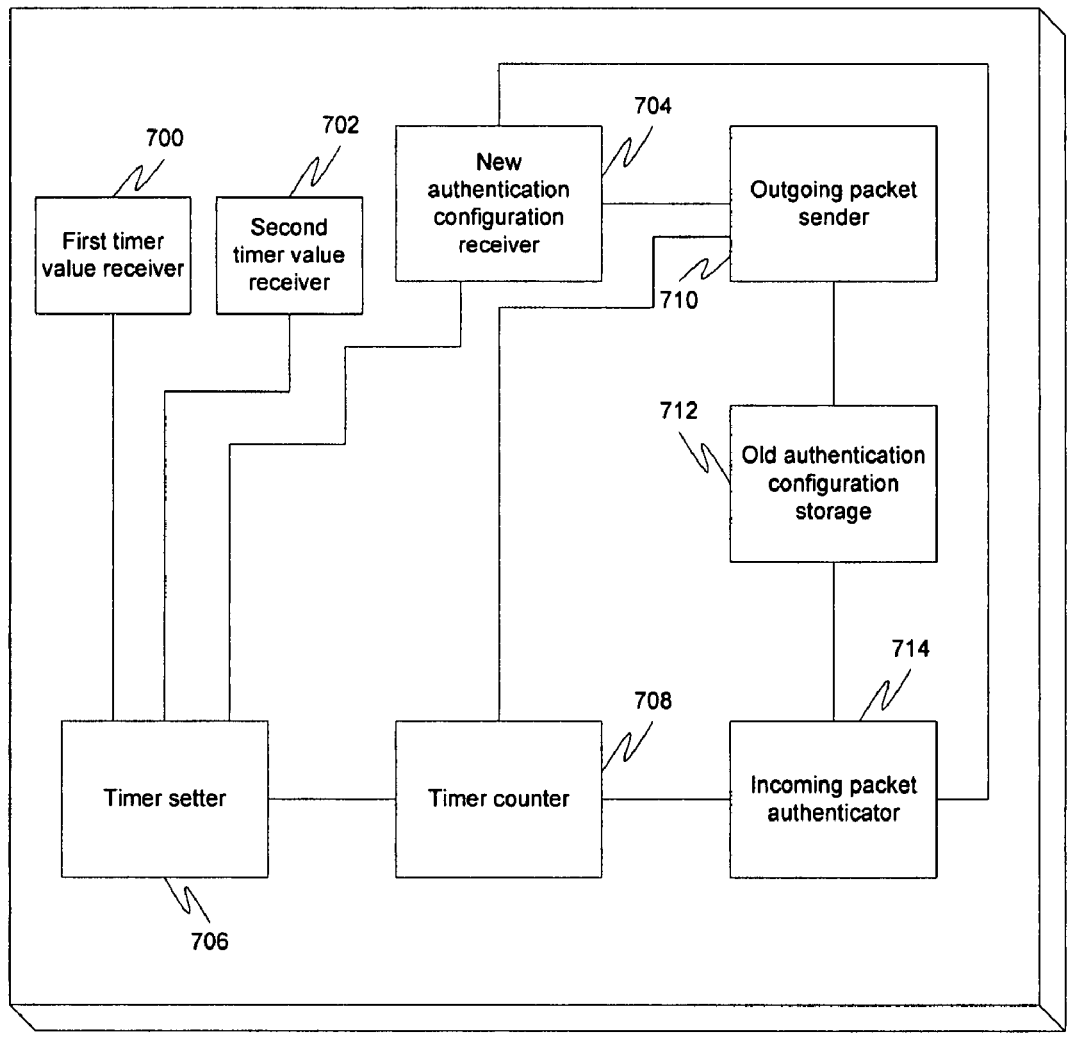
FIG. 7 is a block diagram illustrating an apparatus for implementing a new authentication configuration in a network device having an old authentication configuration in accordance with another specific embodiment of the present invention.

FIG. 7 is a block diagram illustrating an apparatus for implementing a new authentication configuration in a network device having an old authentication configuration in accordance with another specific embodiment of the present invention. A first timer value receiver 700 may receive a first timer value. A second timer value receiver 702 may receive a second timer value. These would likely have been sent by a network administrator and the first timer value should be set such that it represents an amount of time greater than or equal to a predicted amount of time necessary to update all network devices in a network containing the network device with the new authentication configuration. In order to prevent the possibility of authentication problems, the second timer value should be set to be equal to or greater than the first timer value and it should represent an amount of time greater than or equal to the predicted amount of time necessary to update all network devices in a network to switch to the new authentication configuration for sending outgoing packets. A new authentication configuration receiver 704 may receive the new authentication configuration. A timer setter 706 coupled to the first timer value receiver 700, the second timer value receiver 702, and to the new authentication configuration receiver 704 may set a timer to be equal to the first timer value. A timer counter 708 coupled to the timer setter 706 may start the timer counting down a first time. An outgoing packet sender 710 coupled to the timer counter 708, the new authentication configuration receiver 704, and to an old authentication configuration storage 712 may send outgoing packets using the old authentication configuration while the timer is counting down the first time. An incoming packet authenticator 714 coupled to the timer counter 708, the new authentication configuration receiver 704, and to the old authentication configuration storage 712 may authenticate incoming packets using both the old authentication configuration and the new authentication configuration while the timer is counting down the first time. Authenticating packets using both the old authentication configuration and the new authentication configuration may involve, for each packet, authenticating the packet using the old authentication configuration, authenticating the packet using the new authentication configuration, and then accepting the packet as authenticated if either the authenticating under the old authentication configuration or the authenticating under the new authentication configuration is successful.

When the timer expires a first time, the timer setter 706 may set the timer to the second timer value. Then the outgoing packet sender 710 may send outgoing packets using the new authentication configuration and the incoming packet authenticator 714 may authenticate incoming packets using both the old authentication configuration and the new authentication configuration while the timer is counting down the second time. The outgoing packet sender 710 may send outgoing packets using the new authentication configuration and the incoming packet authenticator 714 may authenticate incoming packets using the new authentication configuration while the timer after the timer expires the second time.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for network authentication administration, the method comprising:
    by a network device having a memory, for a first time period upon receiving new network authentication information, sending outgoing network packets using old network authentication information and concurrently using both the old network authentication information and the new network authentication information to authenticate incoming network packets, the first time period comprising an amount of time greater than or equal to a predicted amount of time to update network devices in a network containing the network device with new configuration information; and
    for a second time period beginning upon expiration of the first time period, sending outgoing network packets using the new network authentication information and authenticating incoming network packets using both the old network authentication information and the new network authentication information.

2. The method of claim 1 wherein the length of the first time period is substantially similar to the length of the second time period.

3. The method of claim 2 wherein the length of the first time period is the same as the length of the second time period.

4. The method of claim 1 wherein
    the old network authentication information comprises old configuration or key information; and
    the new network authentication information comprises new configuration or key information.

5. The method of claim 1, further comprising:
    after the second time period, authenticating incoming network packets using the new network authentication information.

6. A nontransitory program storage device readable by a machine, embodying a program of instructions executable by the machine to perform a method for network authentication administration, the method comprising:
    by a network device having a memory, for a first time period upon receiving new network authentication information, sending outgoing network packets using old network authentication information and concurrently using both the old network authentication information and the new network authentication information to authenticate incoming network packets, the first time period comprising an amount of time greater than or equal to a predicted amount of time to update network devices in a network containing the network device with new configuration information; and
    for a second time period beginning upon expiration of the first time period, sending outgoing network packets using the new network authentication information and authenticating incoming network packets using both the old network authentication information and the new network authentication information.

7. The program storage device of claim 6 wherein the length of the first time period is substantially similar to the length of the second time period.

8. The program storage device of claim 7 wherein the length of the first time period is the same as the length of the second time period.

9. The program storage device of claim 6 wherein
    the old network authentication information comprises old configuration or key information; and
    the new network authentication information comprises new configuration or key information.

10. The program storage device of claim 6, the method further comprising:
    after the second time period, authenticating incoming network packets using the new network authentication information.

11. An apparatus for network authentication administration, the apparatus comprising:
    a memory;
    means for, for a first time period upon receiving new network authentication information, sending outgoing network packets using old network authentication information and concurrently using both the old network authentication information and the new network authentication information to authenticate incoming network packets, the first time period comprising an amount of time greater than or equal to a predicted amount of time to update network devices in a network containing the apparatus with new configuration information; and
    means for, for a second time period beginning upon expiration of the first time period, sending outgoing network packets using the new network authentication information and authenticating incoming network packets using both the old network authentication information and the new network authentication information.

12. The apparatus of claim 11 wherein the length of the first time period is substantially similar to the length of the second time period.

13. The apparatus of claim 12 wherein the length of the first time period is the same as the length of the second time period.

14. The apparatus of claim 11 wherein
    the old network authentication information comprises old configuration or key information; and
    the new network authentication information comprises new configuration or key information.

15. The apparatus of claim 11, further comprising:
    means for, after the second time period, authenticating incoming network packets using the new network authentication information.

16. An apparatus for network authentication administration, the apparatus comprising:
    a memory;
    an outgoing packet sender configured to:
        for a first time period upon receiving new network authentication information, send outgoing network packets using old network authentication information, the first time period comprising an amount of time greater than or equal to a predicted amount of time to update network devices in a network containing the apparatus with new configuration information; and
        for a second time period beginning upon expiration of the first time period, send outgoing network packets using the new network authentication information; and an incoming packet authenticator configured to:
- for the first time period, concurrently use both the old network authentication information and the new network authentication information to authenticate incoming network packets; and
- for the second time period, authenticate incoming network packets using both the old network authentication information and the new network authentication information.

17. The apparatus of claim 16 wherein the length of the first time period is substantially similar to the length of the second time period.

18. The apparatus of claim 17 wherein the length of the first time period is the same as the length of the second time period.

19. The apparatus of claim 16 wherein
- the old network authentication information comprises old configuration or key information; and
- the new network authentication information comprises new configuration or key information.

20. The apparatus of claim 16 wherein the incoming packet authenticator is further configured to, after the second time period, authenticate incoming network packets using the new network authentication information.

* * * * *